(12) United States Patent
Roitshtein et al.

(10) Patent No.: US 9,705,807 B2
(45) Date of Patent: Jul. 11, 2017

(54) DISTRIBUTED COUNTERS AND METERS IN PACKET-SWITCHED SYSTEM

(71) Applicant: MARVELL ISRAEL (M.I.S.L) LTD., Yokneam (IL)

(72) Inventors: Amir Roitshtein, Holon (IL); Carmi Arad, Nofit (IL); Gil Levy, Hod Hasharon (IL); Rami Zemach, Givat Shapira (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 189 days.

(21) Appl. No.: 14/638,753

(22) Filed: Mar. 4, 2015

(65) Prior Publication Data

US 2015/0256466 A1 Sep. 10, 2015

Related U.S. Application Data

(60) Provisional application No. 61/947,622, filed on Mar. 4, 2014.

(51) Int. Cl.
| | |
|---|---|
| G06F 15/16 | (2006.01) |
| H04L 12/851 | (2013.01) |
| H04L 12/815 | (2013.01) |
| H04L 12/24 | (2006.01) |
| H04L 12/26 | (2006.01) |

(52) U.S. Cl.
CPC ........ *H04L 47/2483* (2013.01); *H04L 41/082* (2013.01); *H04L 43/0894* (2013.01); *H04L 47/22* (2013.01); *H04L 43/02* (2013.01)

(58) Field of Classification Search
None
See application file for complete search history.

(56) References Cited

U.S. PATENT DOCUMENTS

| | | | |
|---|---|---|---|
| 2010/0157809 A1 | 6/2010 | Duffield et al. | |
| 2011/0149794 A1* | 6/2011 | Kim | H04L 43/024 370/253 |
| 2011/0310851 A1* | 12/2011 | Klingenbrunn | H04W 76/041 370/332 |
| 2014/0029423 A1* | 1/2014 | Badhani | H04L 47/125 370/235 |

OTHER PUBLICATIONS

International Search Report and Written Opinion for PCT/IB2015/051594 dated Jun. 11, 2015.

* cited by examiner

*Primary Examiner* — Brian Whipple

(57) ABSTRACT

Aspects of the disclosure provide a method for counting packets and bytes in a distributed packet-switched system. The method includes receiving a packet stream having at least one packet flow at a device of a packet-switched system having a plurality of distributed devices, statistically determining whether to update a designated device based on receipt of a packet belonging to the packet flow, and transmitting packet counting information to the designated device based on the statistical determination, where the designated device counts packets of the packet flow based on the packet counting information.

24 Claims, 9 Drawing Sheets

US 9,705,807 B2

DISTRIBUTED COUNTERS AND METERS IN PACKET-SWITCHED SYSTEM

INCORPORATION BY REFERENCE

This present disclosure claims the benefit of U.S. Provisional Application No. 61/947,622, "Scalable and Distributed Meters and Counters" filed on Mar. 4, 2014, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a packet-switched system, such as a switch or a router, a plurality of counters and meters are used for traffic monitoring and bandwidth management. Some switching systems are distributed over several devices that are coupled together, however when packets subject to counting and metering are received and processed at multiple distributed devices within the system, determining a count and metering traffic for the packets becomes challenging.

SUMMARY

Aspects of the disclosure provide a method for counting packets and bytes in a distributed packet-switched system. The method includes receiving a packet stream having at least one packet flow at a device of a packet-switched system having a plurality of distributed devices, statistically determining whether to update a designated device based on receipt of a packet belonging to the packet flow, and transmitting packet counting information to the designated device based on the statistical determination, where the designated device counts packets of the packet flow based on the packet counting information.

In an embodiment, the designated device receives a plurality of packet counting information corresponding to the packet flow from a plurality of devices in the packet switched system, and the designated device counts a number of packets to count packets of the packet flow based on the plurality of packet counting information.

Embodiments of the method further include assigning a time slot based on a time wheel at the device, and transmitting packet counting information to the designated device in the time slot assigned by the time wheel.

In alternative embodiments, the method further includes comparing a random number in a range from 0 to 1 with a predefined probability, and, when the random number is smaller than the probability, updating the designated device using the reciprocal of the predefined probability as a count of packets.

Embodiments of the method further include calculating a ratio of a packet size of the packet to a predefined threshold; when a value of the ratio is larger than 1, updating the designated device using the packet size as a count of bytes; and when a value of the ratio is smaller than 1 and larger than a random number in a range from 0 to 1, updating the designated device using the threshold as a count of bytes.

Aspects of the disclosure provide a device in a packet-switched system having a plurality of distributed devices. The device includes an ingress port that is configured to receive a packet stream having at least one packet flow, a local counting engine that is configured to statistically determine whether to update a designated device among the plurality of distributed devices in the packet-switched system based on receipt of a packet belonging to the packet flow, and an update interface that is configured to transmit packet counting information to the designated device based on the statistical determination, where the designated device counts packets of the packet flow based on the packet counting information.

Aspects of the disclosure provide a designated device in a packet-switched system having a plurality of distributed devices. The designated device includes an update interface that is configured to receive a plurality of packet counting information from a plurality of distributed devices in the packet-switched system where the packet-switched system receives a packet stream having at least one packet flow, and a central counting engine that is configured to count packets of the packet flow based on the plurality of packet counting information.

In an embodiment, the central counting engine is configured to update a counter based on the plurality of packet counting information to count packets of the packet flow. In an embodiment, the central counting engine is further configured to count a number of packets to count packets of the packet flow. In an alternative embodiment, the central counting engine is further configured to count a number of bytes to count packets of the packet flow.

Aspects of the disclosure provide a method for measuring traffics of packet flows in a distributed packet-switched system. The method includes receiving a packet stream having at least one packet flow at a device of a packet-switched system having a plurality of distributed devices, statistically determining whether to update a designated device based on receipt of a packet belonging to the packet flow, and transmitting packet counting information to the designated device based on the statistical determination, where the designated device measures traffic of the packet flow based on the packet counting information. The method further includes receiving an indicator from the designated device of a traffic state of the packet flow determined based on the packet counting information, and storing the indicator of the traffic state in the device. The method further includes storing an indicator of a traffic state of the packet flow determined based on the packet counting information received by the designated device, and processing packets belonging to the packet flow based on the indicator of the traffic state stored in the device.

In an embodiment, the designated device receives a plurality of packet counting information corresponding to the packet flow from a plurality of devices in the packet switched system, and the designated device measures traffic of the packet flow based on the plurality of packet counting information.

The method further includes storing an indicator of a traffic state of the packet flow determined based on the plurality of packet counting information received by the designated device, and processing packets belonging to the packet flow in each of the plurality of devices based on the stored indicator of the traffic state.

Aspects of the disclosure provide a device in a packet-switched system having a plurality of distributed devices. The device includes an ingress port that is configured to receive a packet stream having at least one packet flow, a local counting engine that is configured to statistically determine whether to update a designated device among the plurality of distributed devices in the packet-switched system based on receipt t of a packet belonging to the packet flow, and an update interface that is configured to transmit packet counting information to the designated device based on the statistical determination, where the designated device measures traffic of the packet flow based on the packet counting information.

In an embodiment, the update interface is further configured to receive a first indicator of a traffic state of the packet flow from the designated device that is determined based on the packet counting information; the local counting engine further comprises a memory that is configured to store a second indicator of a traffic state of the packet flow determined based on the packet counting information received by the designated device, and is further configured to store the first indicator of the traffic state of the packet flow to the memory in response to receiving the first indicator of traffic state from the update interface.

In an embodiment, the device further includes a forwarding processor including a memory that is configured to store an indicator of a traffic state of the packet flow determined based on the packet counting information received by the designated device, and the forwarding processor is configured to process packets belonging to the packet flow based on the indicator stored in the device.

In an embodiment, the device further comprises a forwarding processor including a memory that is configured to store a first indicator of a traffic state of the packet flow determined based on the packet counting information received by the designated device, and the forwarding processor is configured to transmit a counting update request to the local counting engine based on receipt of a packet belonging to the packet flow and store a second indicator of a traffic state of the packet flow in the memory based on receipt of the second indicator of the traffic state from the local counting engine.

Aspects of the disclosure provide a designated device in a packet-switched system having a plurality of distributed devices. The device includes an update interface that is configured to receive a plurality of packet counting information from a plurality of distributed devices in the packet-switched system where the packet-switched system receives a packet stream having at least one packet flow, and a central counting engine that is configured to measure traffic of the packet flow based on the plurality of packet counting information.

In an embodiment, the central counting engine is configured to calculate an indicator of a traffic state of the packet flow based on the plurality of packet counting information to measure traffic of the packet flow. In another embodiment, the update interface is further configured to transmit the indicator of the traffic state of the packet flow to the plurality of distributed devices.

Aspects of the disclosure provide a method for metering traffics of packet flows in a distributed packet-switched system. The method includes receiving a packet stream having at least one packet flow at a device of a packet-switched system having a plurality of distributed devices, statistically determining whether to update a designated device based on receipt of a packet belonging to the packet flow, and transmitting packet counting information to the designated device based on the statistical determination, where the designated device meters traffic of the packet flow based on the packet counting information.

Aspects of the disclosure provide a device in a packet-switched system having a plurality of distributed devices. The device includes an ingress port that is configured to receive a packet stream having at least one packet flow, a local counting engine that is configured to statistically determine whether to update a designated device among the plurality of distributed devices in the packet-switched system based on receipt t of a packet belonging to the packet flow, and an update interface that is configured to transmit packet counting information to the designated device based on the statistical determination, where the designated device meters traffic of the packet flow based on the packet counting information.

Aspects of the disclosure provide a designated device in a packet-switched system having a plurality of distributed devices. The designated device includes an update interface that is configured to receive a plurality of packet counting information from a plurality of distributed devices in the packet-switched system where the packet-switched system receives a packet stream having at least one packet flow, and a central counting engine that is configured to meter traffic of the packet flow based on the plurality of packet counting information.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1A:
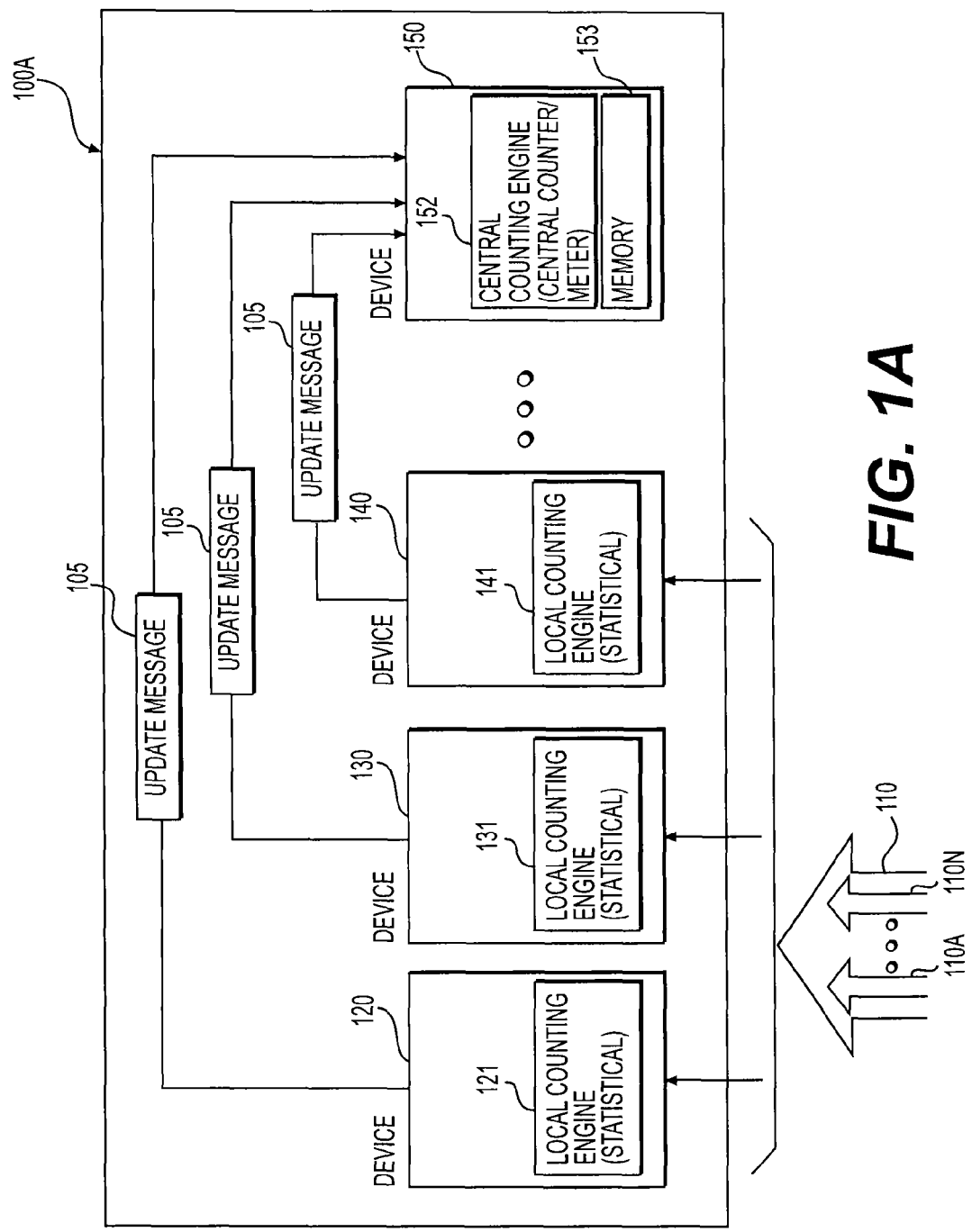
FIG. 1A shows a packet-switched system 100A according to an embodiment of the disclosure.

FIG. 1A shows a packet-switched system 100A according to an embodiment of the disclosure. The system 100A includes a plurality of distributed devices 120-150 that are coupled together via a communication network (not shown). In an embodiment, the device 150 has a database that keeps records of values of counters or meters, and the devices 120-140 as clients of the database transmit update messages 105 to update records in the database. In one example, the database provides coherent services and supports read-modify-write (RMW) messages. When processing RMW messages on a certain record, the database denies any other update requests on the certain record until the RMW operation is completed. For example, at the device 150, the central counting engine 152 and the memory 153 performs a function of the database, and the central counting engine 152 can process RMW messages to update records stored in the memory 153, thus providing coherent services to the devices 120-140. In another example, the database provides non-coherent services, and support read/write (R/W) messages. When processing R/W message, the database permits a client to access a record for updating before another client completes its update, thus causing a race condition in which unexpected error is induced in the record. For example, at the device 150, the central counting engine 152 and the memory 153 performs a function of the database, however, the central counting engine 152 supports R/W message instead of RMW message to update records stored in the memory 153, thus providing non-coherent services to the devices 120-140. In addition, the database has limited message processing rate (expressed as a number of messages processed per unit of time), thus requiring aggregated update message generation rate (expressed as a number of updated message generated per unit of time) of the devices 120-140 to be below the database message processing rate.

The clients (the devices 120-140) process events and generate update messages 105 to update the database. For example, when an event of a packet arrival or departure happens at the device 120, the device 120 generates an update message 105 to update a counter or meter record in the database. The type of the update message 105 can be of an RMW message or an R/W message depending on service types of the database. Specifically, for a database providing coherent service, an RWM message is generated; for a database providing non-coherent service, an R/W message is generated.

In an embodiment, each of the clients (the devices 120-140) processes events, and an aggregated event processing rate (expressed as a number of events processed per unit of time) is much faster than the database message processing rate. In order to match the aggregated update message generation rate with the database message processing rate, the devices 120-140 adopt a statistical approach to generate update messages.

In another embodiment, multiple devices 120-140 transmit update messages to update a same database record providing non-coherent service at the device 150. In order to avoid a race condition when accessing the same database record in the database providing non-coherent service, the devices 120-140 adopt a time division access mechanism.

In an embodiment, the system 100A is an integrated circuit (IC) chip. The devices 120-140 each is a packet processing engine, and the device 150 performs a function of a centralized database. In another embodiment, the devices 120-140 are packet processing engines existing on an IC chip, but the device 150 is a memory, such as a dynamic random-access memory (DRAM), that stores database records and is located off the IC chip.

In an embodiment, the system 100A is a chassis switch, and the devices 120-150 each is an application specific integrated circuit (ASIC) located at respective distributed line cards in the chassis switch. In another embodiment, the system 100A is a data center network comprised of numerous switches and servers, and the devices 120-150 are separate switch modules located in different switches.

In an embodiment, in the system 100A, among the plurality of distributed devices 120-150, the devices 120-140 each has a local counting engine 121-141 counting bytes or packets of a packet flow, respectively, and transmit update messages 105 to the device 150. The device 150 has a database where a central counting engine 152 performs a function of central counter or meter to measure traffic of the packet flow and a memory 153 stores counter values.

In an embodiment, the system 100A utilizes a distributed counting and metering mechanism to count select packets or bytes of a packet stream 110, referred to as a packet flow, and to measure traffic of the packet flow. Generally, a packet flow is defined as a sequence of packets that have various shared attributes. For example, packets having the same source and destination addresses can be defined as a packet flow. For another example, packets belonging to a virtual local area network (VLAN) can be defined as a packet flow. The packet stream 110 received at the system 100A includes multiple packet flows, in an embodiment, such as packet flows 110A-110N. Each packet flow 110A-110N is received and processed at different devices 120-140 in the system 100A. For example, the packet flow 110A is comprised of packets belonging to a VLAN and the VLAN is configured on multiple ports associated with different devices 120-140 in the system 100A. Accordingly, packets of the packet flow 110A are received and processed at different devices 120-140. In addition, packets in the packet stream 110 belonging to different packet flows can be treated differently according to configurations of the system 100A corresponding to different packet flows. In an embodiment, a packet can be identified as belonging to a specific packet flow by examining values in one or multiple fields of its header when being processed in the system 110A. Accordingly, select packets of the packet stream 110 can be treated differently.

In the embodiment, as shown in FIG. 1A, the local counting engines 121-141 count bytes or packets of one or more packet flows locally, and the devices 120-140 transmit update messages 105 including respective packet counting information to the central counting engine 152. The packet counting information includes counts of bytes or packets of one or more packet flows obtained locally at the respective devices 120-140. The device 150 is designated to perform a function of a central counter or meter to measure traffics of the packet flows. Specifically, in an embodiment, the designated device 150 receives update messages 105 including the packet counting information, and the central counting engine 152 updates counter values stored in the memory 153 based on the packet counting information to perform a function of a central counter to measure traffics of the packet flows; in another embodiment, the central counting engine 152 meters traffics of the packet flows based on the packet counting information to perform a function of a central meter to measure traffics of the packet flows.

In an example, the packet stream 110 including the packet flows 110A-110N enters the system 100A at a high data rate, such as a packet rate of 1.5 Giga packets per second (pps). Each of the packet flows 110A-110N in the packet stream 110 is received at various devices 120-140. In the example, the packets of the packet flow 110A belong to a VLAN and each carries a tag of the VLAN in a field of the packet. Thus, the packets of the packet flow 110A can be identified by the tag at the devices 120-140. At the device 120, for example, the local counting engine 121 determines a number of bytes or packets for the received packets belonging to the packet flow 110A, and the device 120 transmits the number to the central counting engine 152 by transmitting the update messages 105. Similarly, the devices 130 and 140 transmit their local packet counting information of the packet flow 110A to the central counting engine 152. In such a way, the central counting engine 152 can have a global view of counts of the packets or bytes of the packet flow 110A received at different devices 120-140 in the system 100A.

It is noted that packets counted at the devices 120-140 can come from other devices inside the system 100A and leave the system 100A after being counted in various embodiments.

The terms "packet" and "frame" are usually used with layer 3 protocols and layer 2 protocols, respectively, in the Open Systems Interconnection (OSI) model in the field of networking, but they are used interchangeably for ease of explanation in the context described in this detailed description.

According to an embodiment of the disclosure, the local counting engines 121-141 adopt a statistical approach to statistically determine whether to transmit packet counting information to update the designated device 150 upon an arrival of a packet subject to counting, and to statistically calculate a count of bytes or packets, as an estimation of the bytes or packets, for the transmission of the packet counting information.

In the statistical approach, when a packet subject to counting arrives, a local counting engine will determine whether to update the designated device based on a probability, expressed as P. In one embodiment where number of packets is counted, the probability P is predefined; in another embodiment where number of bytes is counted, the probability P is calculated based on a packet size (K bytes), of the packet subject to counting and a predefined threshold (X bytes), using a formula P=K/X. To make the determination, a random number in a range from 0 to 1 is generated and used to compare with the probability. If the random number is smaller than the probability, the local counting engine transmits packet counting information to update the designated device; otherwise, the local counting engine does not transmit.

In the statistical approach, when local counting engine determines to transmit the packet counting information, an estimation of packets or bytes is calculated. In case of counting packets, the estimation of the packets to be transmitted equals to 1/P. In case of counting bytes of packets, the estimation of bytes to be transmitted equals to the threshold X; for scenarios that packet size K is larger than the threshold X, the packet size K is used as the estimation of bytes to be transmitted.

For example, a probability of 10% is predefined for counting number of packets of the packet flow 110A. The average effect of the statistical approach under such a configuration is that, out of every 10 packets, a transmission of the packet counting update information is performed for only a single packet. However, a number of 10 packets are counted for the transmission. As a result, the counting reflects counts of the packets over the long run, while the frequency of transmission of updates is reduced by 90%. For another example, a probability P is calculated for counting bytes of the packet flow 110A based on a packet size K of the received packet and a predefined threshold X using a formula P=K/X. When K=64 bytes, and X=512 bytes, there is probability P=K/X=12.5% to transmit an update message. However, a number of X=512 bytes are counted for the transmission. Similarly, for packets with a packet size of 64 bytes, the counting reflects counts of the bytes over the long run, while the frequency of transmission of updates operation is reduced by 87.5%. The reduction of transmission of updates not only decreases communication traffic between the devices 120-140 and the device 150, but also reduces demand for access to memories where counters and meters are stored.

Figure 1B:
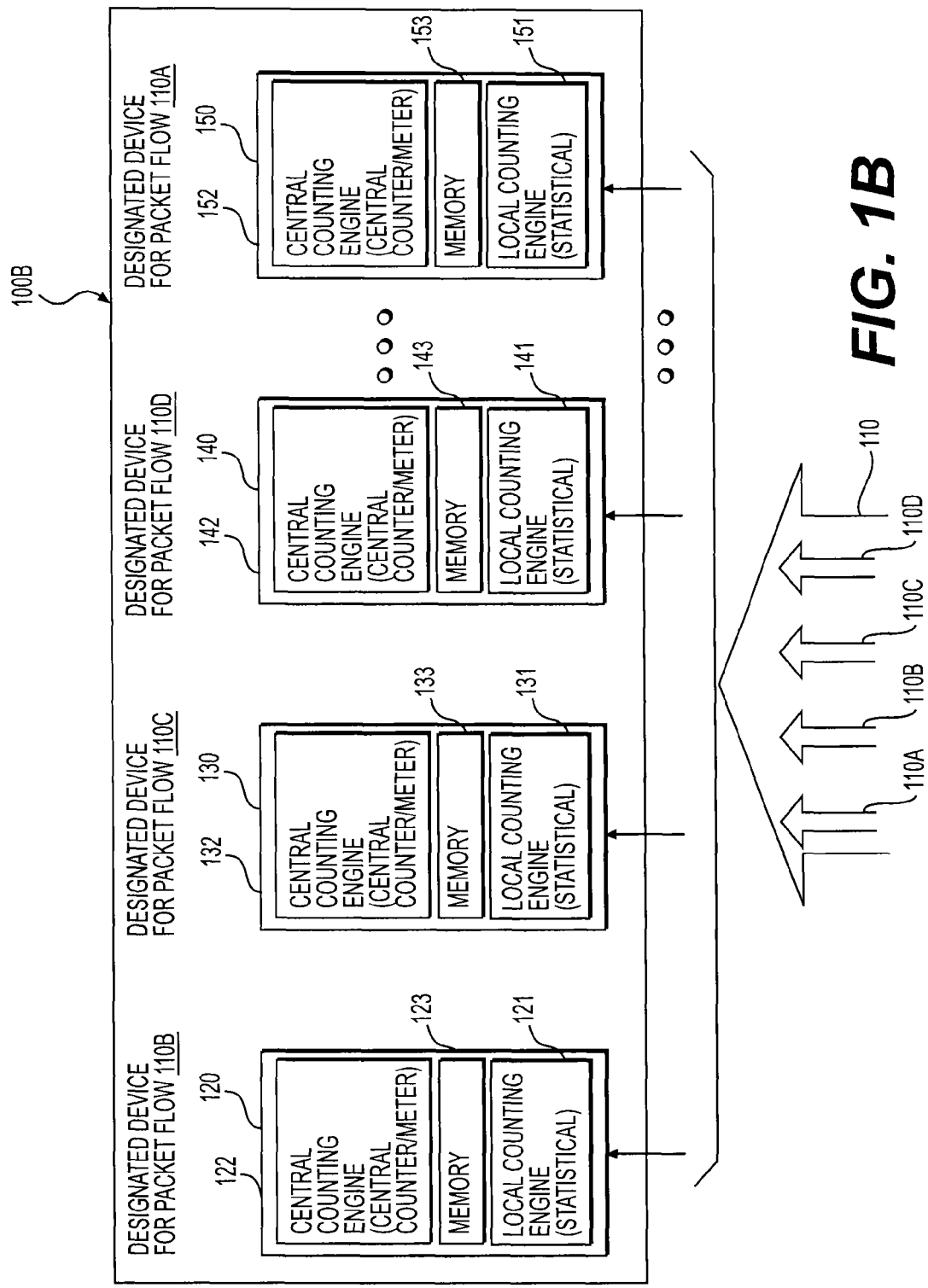
FIG. 1B shows a packet-switched system 100B having multiple designated devices for measuring traffics of different packet flows according to an embodiment of the disclosure.

FIG. 1B shows a packet-switched system 100B having multiple designated devices for measuring traffics of different packet flows according to an embodiment of the disclosure. The system 100B is similar to the system 100A, and includes the plurality of the distributed devices 120-150. However, different from the system 100A, the devices 120-130 each includes its own central counting engine 122-142 and memory 123-143 to perform a function of a database, and the device 150 includes its own local counting engine 151.

As shown, in one embodiment, there is a packet stream 110 including multiple packet flows 110A-110D entering the system 100B. Each packet flow 110A-110D can arrive at multiple devices from 120 to 150. In the embodiment, each packet flow 110A-110D has its own special tag of a VLAN carried by the packets belonging to this packet flow, so that each of the devices 120-150 can identify the packets while processing packets from different flows 110A-110D.

To count packets or bytes of the packet flows 110A-110D, each packet flow 110A-110D is designated a different device to perform function of a central counter or meter. For example, in addition to the device 150 that is designated to the packet flow 110A, the devices 120-140 are designated to the packet flows 110B-110D, respectively. Of course, it should be understood that, in various embodiments, there are numerous packet flows processed at the system 100B, and a designated device, such as devices 120-150, is designated for more than one flow.

To perform function of counting or metering, each of the designated devices 120-150 includes a central counting engine from 122 to 152, respectively, and a memory from 123 to 153, respectively. Each of the central counting engines 122-152 receives update messages from multiple devices 120-150 and updates counter values or meters traffics corresponding to the respective packet flows 110A-110D. Each of the memory 123-153 stores counter values corresponding to the respective packet flow 110A-110D.

Generally, counter values are stored in high speed memories. A capability of a high speed memory to process access request can be measured in read-modify-write operation per second (RMW/sec). A typical value of high speed memory for this measurement can be 600 RMW/sec. In the FIG. 1B example, for a specific flow, counter-update requests coming from multiple devices 120-150 need to access a same memory. Therefore, for the specific packet flow, a maximum number of the total counter-update requests for a certain time interval is limited by the access request processing capability of the memory.

In operation, similar to the process described above, each of the counting engines 121-151 at the devices 120-150 statistically makes a decision to transmit local packet counting information. In addition, at each of the devices 120-150, packet counting information for packets in different flows are transmitted to different designated devices 120-150. For example, at the device 120, packet counting information of the packet flow 110C is transmitted to the device 130 which is designated for counting packets in the packet flow 110C. While for the packets of the packet flow 110D processed at the device 120, packet counting information is transmitted to the device 140 which is designated for counting packets in the packet flow 110D. For the packets of the packet flow 110B processed at the device 120, the transmission operation can be conducted internally without sending update messages out of the device 120. In addition, as described above, packet counting information of the packet flow 110A is transmitted to the device 150 which is designated for counting packets in the packet flow 110A.

The distributed counting mechanism shown in FIGS. 1A and 1B is scalable when bandwidth capacity and number of devices of the system 100A or 100B increases according to an aspect of the disclosure. First, the distributed counting mechanism reduces number of counters configured for each packet flow. For example, in the system 100A, instead of maintaining separated counters at each device for the packet flow 110A, only one central counter at the device 150 is needed in conjunction with local counting engines 121-141 in the distributed devices 120-140. Reduced number of counters leads to reduced memory size, thus reducing cost of the system 100A. Second, as shown in the system 100B, because central counters or meters are distributed at separate devices, load of memory access and update messages can be distributed among multiple devices. Third, as described above, adoption of the statistical approach decreases memory access demands, thus more distributed local counting engines can be supported in one system.

Figure 2:
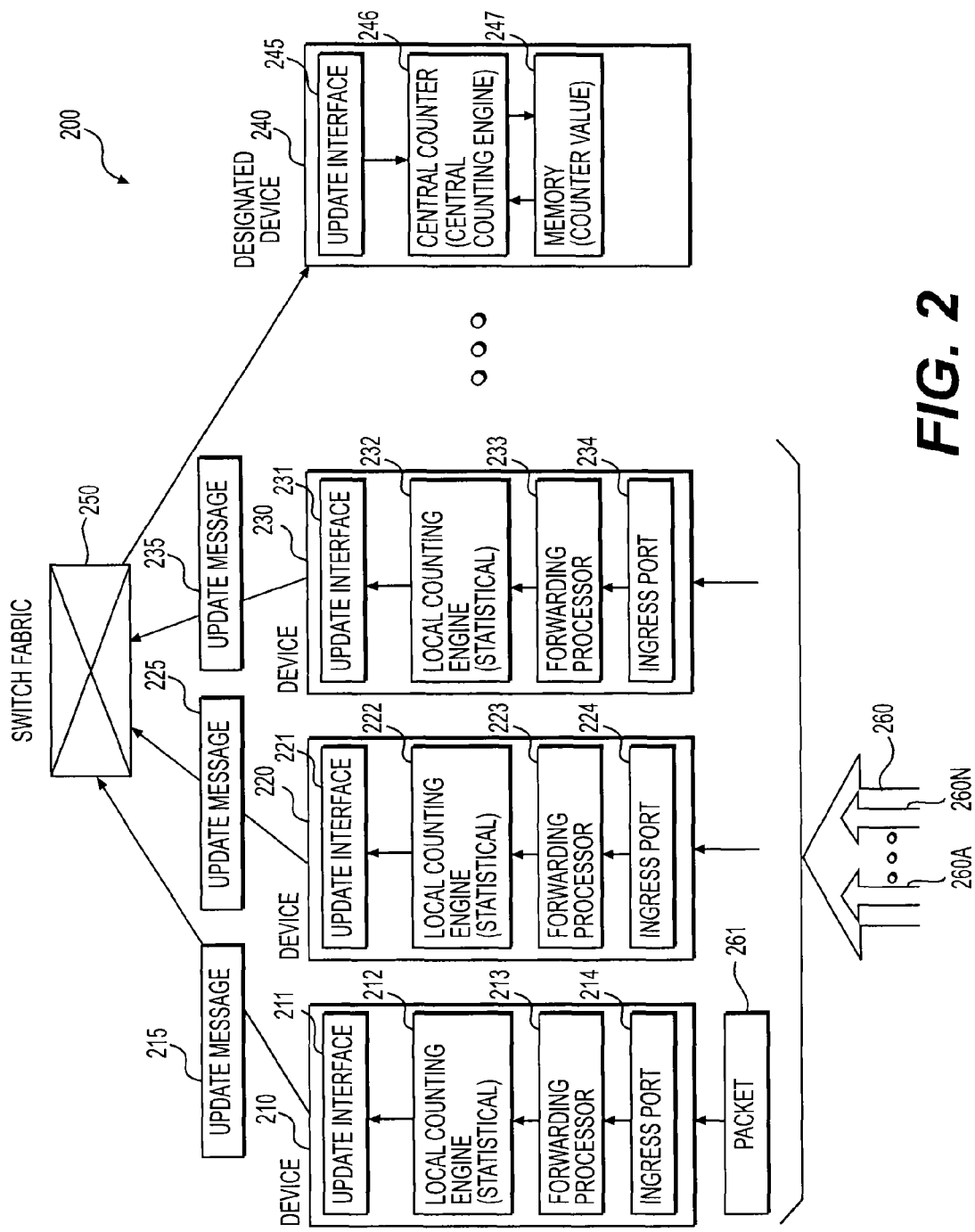
FIG. 2 shows a chassis switch 200 including a distributed counter according to an embodiment of the disclosure.

FIG. 2 shows a chassis switch 200 including a distributed counter according to an embodiment of the disclosure. The chassis switch 200 includes a plurality of distributed devices 210-240 and a switch fabric 250. The switch fabric 250 provides interconnections for the plurality of devices 210-240.

Among the plurality of distributed devices 210-240, the device 240 is designated to perform the function of a central counter for counting select packets or bytes of a packet stream 260 including multiple packet flows 260A-260N. The designated device 240 includes an update interface 245, a central counter 246 and a memory 247. The update interface 245 controls communication process between the device 240 and the devices 210-230. Specifically, the update interface 245 receives update messages 215-235 from the devices 210-230, and passes packet counting information included in the messages 215-235 to the central counter 246.

The devices 210-230 each includes an update interface 211-231, a local counting engine 212-232, a forwarding processor 213-233, and an ingress port 214-234, respectively. The update interfaces 211-231 control communication process between the devices 210-230 and the device 240. Specifically, the update interfaces 211-231 transmit messages 215-235 to the device 240. The forwarding processors 213-233 generally perform packet processing functions such as forwarding look-up, packet modification, packet classification, traffic management, and the like. The ingress ports 214-234 receive packets of the packet stream 260 entering the chassis switch 200 and pass the packets to the forwarding processor 213-233, respectively.

The update interface 211-231, local counting engines 212-232, the update interface 245, the central counter 246 and the memory 247 together forms a distributed counter performing function of counting select packets or bytes of the packet stream 260 according to an aspect of the disclosure. In an embodiment, the distributed counter counts packets and bytes of the packet flow 260A. The distributed counting process conducted by the distributed counter will be described below.

As shown, packets of the packet stream 260 enter the chassis switch 200 and are received at the ingress ports 214-234. Packets of the packet flow 260A belonging to a VLAN carry a tag of the VLAN in a field of the packet, thus can be identified as a packet subject to counting. Generally, in an embodiment, each device 210-230 receives and processes packets of multiple flows that form a packet stream flowing into each device. Each packet flow of packets can have its own special tag indicative of a specific packet flow. Accordingly, packets belonging to different packet flows can be identifies and processed differently according to respective configurations.

As shown, at the device 210, the ingress port 214 receives a packet 261 belonging to the packet flow 260A and passes it to the forwarding processor 213. At the forwarding processor 213, the packet 261 is recognized as a packet subject to counting, and a counting request is transmitted to the local counting engine 212. In an embodiment, the counting request includes a size of the packet 261 in number of bytes and the information indicative of the VLAN, such as the tag of the VLAN. In another embodiment where number of packets is counted instead of bytes, information of the size of the packet 261 may be omitted.

Triggered by the request, the local counting engine 212 first statistically determines whether to transmit counting information to update the designated device 240 using the statistical approach. If the determination is negative, the counting process stops and nothing happens next. Otherwise, the local counting engine 212 calculates an estimation of packets or bytes based on the statistical approach. Thereafter, the update interface 211 creates an update message 215 and transmits the message to the designated device 240 via the switch fabric 250. The update message 215 can include the estimation of bytes or packets and the information indicative of the VLAN.

At devices 220 and 230, when packets belonging to the packet flow 260A are received, similar processes are carried out using the statistical approach, and counter-update messages 225 and 235 including packet counting information are sent to the designated device 240.

At the designated device 240, the device 240 receives update messages 215-235, and performs counter-update operation. For example, the update interface 245 receives the update message 215 from the device 210 and passes the counting information to the central counter 246. Then, the central counter 246 updates a counter value stored in the memory 247 corresponding to the packet flow 260A. Specifically, the central counter 246 reads the counter value from the memory 247, aggregates the estimation of bytes or packets carried in the message 215 with the counter value read from the memory 247 to obtain a sum, and writes the sum back to the memory 247.

Figure 3A:
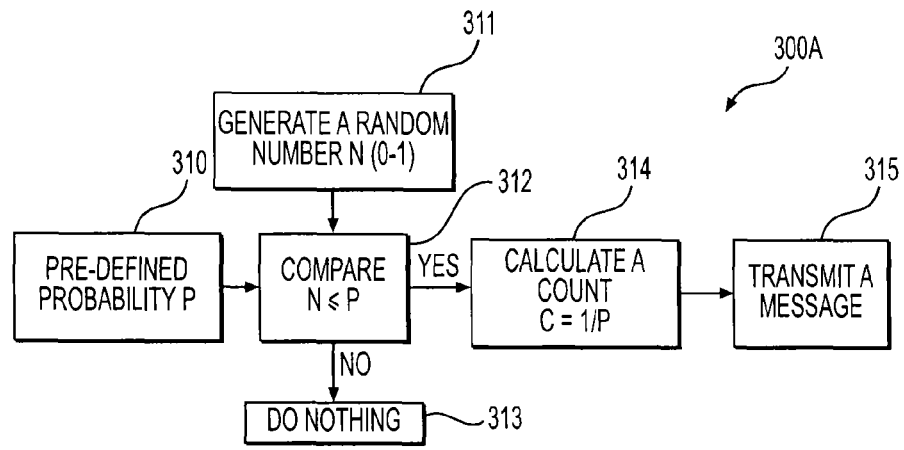
FIGS. 3A and 3B show two example processes illustrating the statistical approach applied in the distributed counter in the FIG. 2 example according to an embodiment of the disclosure.
Figure 3B:
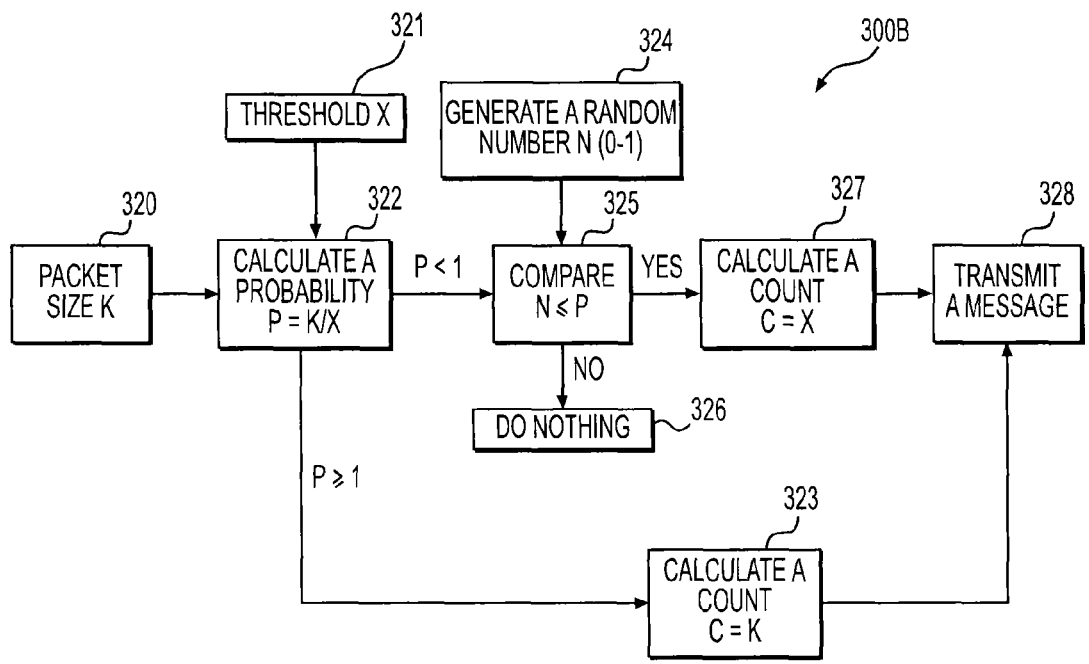

FIGS. 3A and 3B show two example processes illustrating the statistical approach applied in the distributed counter in the FIG. 2 example according to an embodiment of the disclosure. In the FIG. 3A example, the distributed counter counts packets, while in the FIG. 3B example, the distributed counter counts bytes. In the two examples, the probability of transmitting packet counting information and the estimation of bytes or packets to be transmitted are determined differently for counting bytes and counting packets. Operations at the device 210 in FIG. 2 will be used to describe the FIGS. 3A and 3B examples below.

In FIG. 3A, for counting packets, a probability P for sending a counter-update message is predefined at 310. When a counting request is received at the local counting engine 212, the local counting engine 212 statistically determines whether to transmit an update message to update the designated device 240 in FIG. 2. Specifically, the local counting engine 212 first randomly generates a number N between 0 and 1 at 311, then compares N with the predefined probability P at 312. If N is larger than P, the process ends at 313. If N is equal to or smaller than P, the local counting engine 212 reaches a decision to transmit an update message. Then, the local counting engine 212 calculates an estimation C using a formula, C=1/P, as a number of packets to be transmitted at 314. For example, if P is predefined as 10%, the estimation of packets to be transmitted will be 1/(10%), equal to 10, in this example. Finally, the update interface 211 transmits the message including an estimation of 10, for example, to the designated device 240 at 315.

In FIG. 3B, the bytes of packets are being counted. As shown, a counting request is received at the local counting engine 212, and a packet size of K bytes is included in the request at 320. In addition, a thresh hold of X bytes is preconfigured at 321. Triggered by the counting request, the local counting engine 212 calculates a ratio P based on a formula, P=K/X at 322.

If P<1, the local counting engine 212 randomly generates a number N between 0 and 1 at 324, and compares N with P at 325. If N is smaller than or equals to P, the local counting engine 212 reaches a decision that a counter-update message will be sent. Then, the local counting engine 212 calculates an estimation of the bytes, represented as C, based on a formula, C=X, at 327. Next, the update interface 211 transmits a counter-update message including the estimation X at 328. If N is greater than P, the process stops at 326.

If P is greater than or equals to 1 at 322, the packet size K will be taken as the count C, that is C=K, at 323. Finally, the update interface 211 transmits a counter-update message including the count K at 328.

In the FIG. 3B process, the ratio P, when P<1, is the probability for determining whether to transmit an update message. Because P=K/X, an increase to the threshold X leads to the decrease of the frequency to transmit an update message.

In an embodiment, when data rate of the packets subject to counting in the packet stream 260 and the number of devices involved in statistical counting in the chassis switch 200 increases, the probability P for counting packets defined in the FIG. 3A example and the threshold X for counting bytes defined in the FIG. 3B example can be suitably adjusted to maintain the memory access demand within the limit of the access request processing capability of the memory that contains the counters at the designated device 240. Specifically, the probability P can be decreased and the threshold X can be increased to decrease the frequency of the counter-update requests.

Figure 4A:
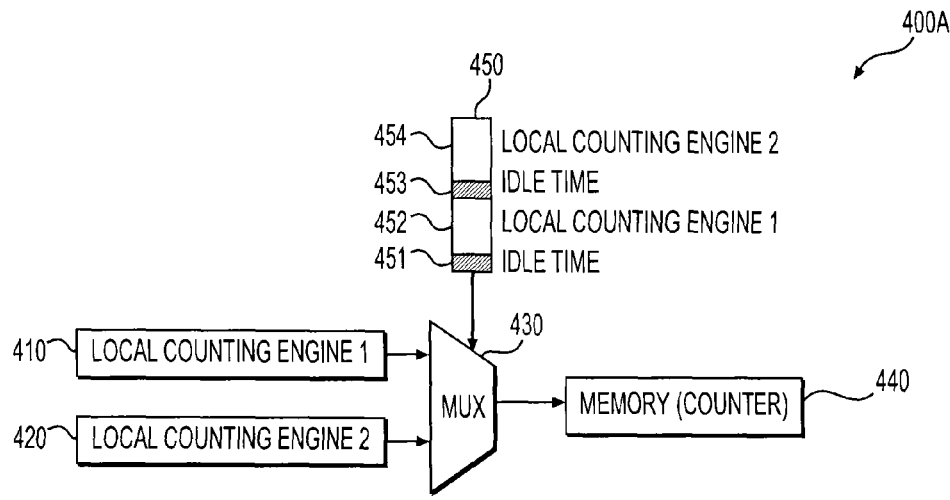
FIG. 4A shows a diagram 400A illustrating a time division access mechanism for accessing a database record according to an embodiment of the disclosure.

FIG. 4A shows a diagram 400A illustrating a time division access mechanism for accessing a database record according to an embodiment of the disclosure. The diagram 400A includes two local counting engines 410 and 420, a multiplexer 430, a time slot sequence 450 and a memory 440 holding a record of a counter.

The time slot sequence 450 is determined using a time wheel according to an aspect of the disclosure. The time wheel is a timer facility that triggers different operations in different time slots. In an embodiment, the time wheel is implemented as a distributed mechanism under control of a central clock in the chassis switch 200. For example, in the FIG. 2 example, each update interface 211-231 includes a time wheel that is controlled by a clock signal from a central clock in the chassis switch 200.

In operation, the two local counting engines 410 and 420 try to access to the memory 440 under the control of the multiplexer 430, and the multiplexer 430 grants access to the memory according to the time slot sequence 450. For example, during a time slot 452, only the local counting engine 410 can access to the memory 440 and perform read-modify-write operations on the memory 440, while during a time slot 454, the local counting engine 420 is granted exclusive access to the memory 440. The idle time 453 or 451 is used to ensure that memory access operations, such as a read-modify-write operations, for each time slot 454 or 452 can be completely finished before access is granted to another counting engine.

In one embodiment, the above time division access mechanism is used to avoid a race condition between multiple local counting engines. A race condition is a situation in which two local counting engines may access a memory containing a counter at the same time to update a counter value, thus causing an unexpected error in a counting process.

Figure 4B:
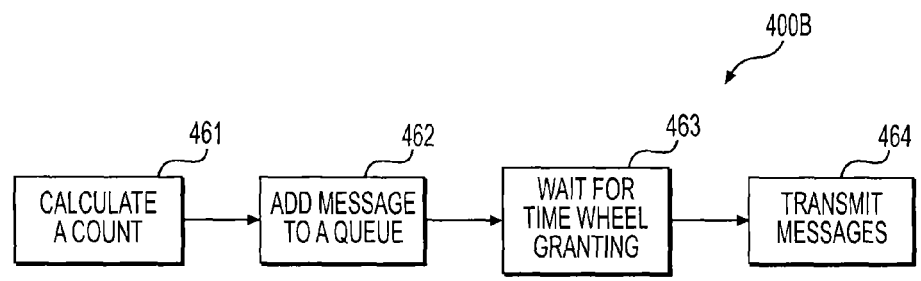
FIG. 4B shows an example process 400B utilizing the time division access mechanism according to an embodiment of the disclosure.

FIG. 4B shows an example process 400B utilizing the time division access mechanism described above according to an embodiment of the disclosure.

As shown, at a local counting engine of a device, such as the device 210 in the FIG. 2, after a statistical determination is conducted, a count of bytes or packets is calculated first at 461. Next, at an update interface of the device, a message including the count is created and added to a message queue at 462. Then, the update interface waits for a time slot granted by a time wheel in the update interface at 463. Finally, when permitted by the time wheel, messages in the queue are transmitted to a designated device during the assigned time slot at 464. In addition, when the time slot ends, the update interface stops the message transmission operation.

Figure 4C:
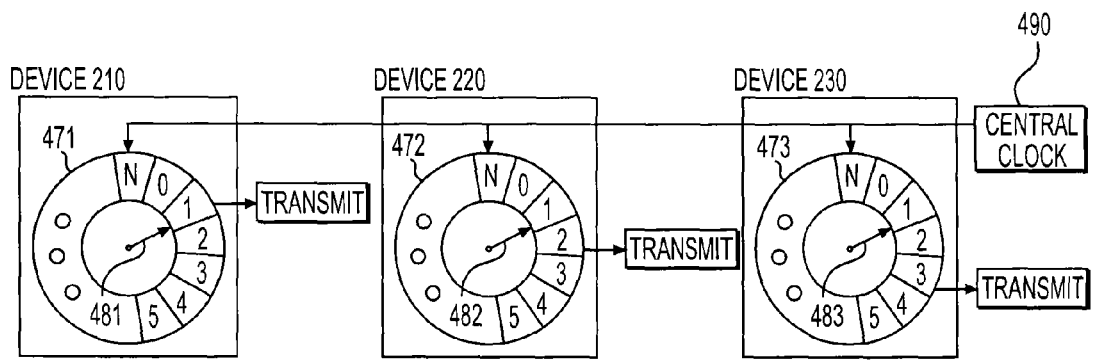
FIG. 4C shows an example time wheel facility 400C in the chassis switch 200 according to an embodiment of the disclosure.

FIG. 4C shows an example time wheel facility 400C in the chassis switch 200 for realizing a time division access mechanism according to an embodiment of the disclosure. As shown, in an embodiment, each device 210-230 includes a time wheel 471-473. Each time wheel 471-473 has a cursor 481-483. The time wheels 471-473 are controlled by a same clock signal from a central clock 490 in the chassis switch 200, thus the time wheels 471-473 are synchronized and the cursors 481-483 moves in a same pace and are at the same position at any time.

Each time wheel 471-473 has N+1 time slots from time slot 0 to time slot N. In an example, the packet flow 260A is received and processed at the devices 210-230. At different devices, transmissions of packet counting information of the packet flow 260A are assigned with different time slots. For example, at the device 210, time slot 1 is assigned to the transmission; at the device 220, time slot 2 is assigned for the transmission; at device 230, time slot 3 is assigned for the transmission. When the cursors 481-483 moves to a time slot, the transmissions associated with the time slot is triggered. In this way, the transmissions at different devices 220-230 are triggered at different time and the race condition between multiple local counting engines are avoided. In various embodiments, the time wheels 471-473 are implemented using suitable software or hardware.

Figure 5:
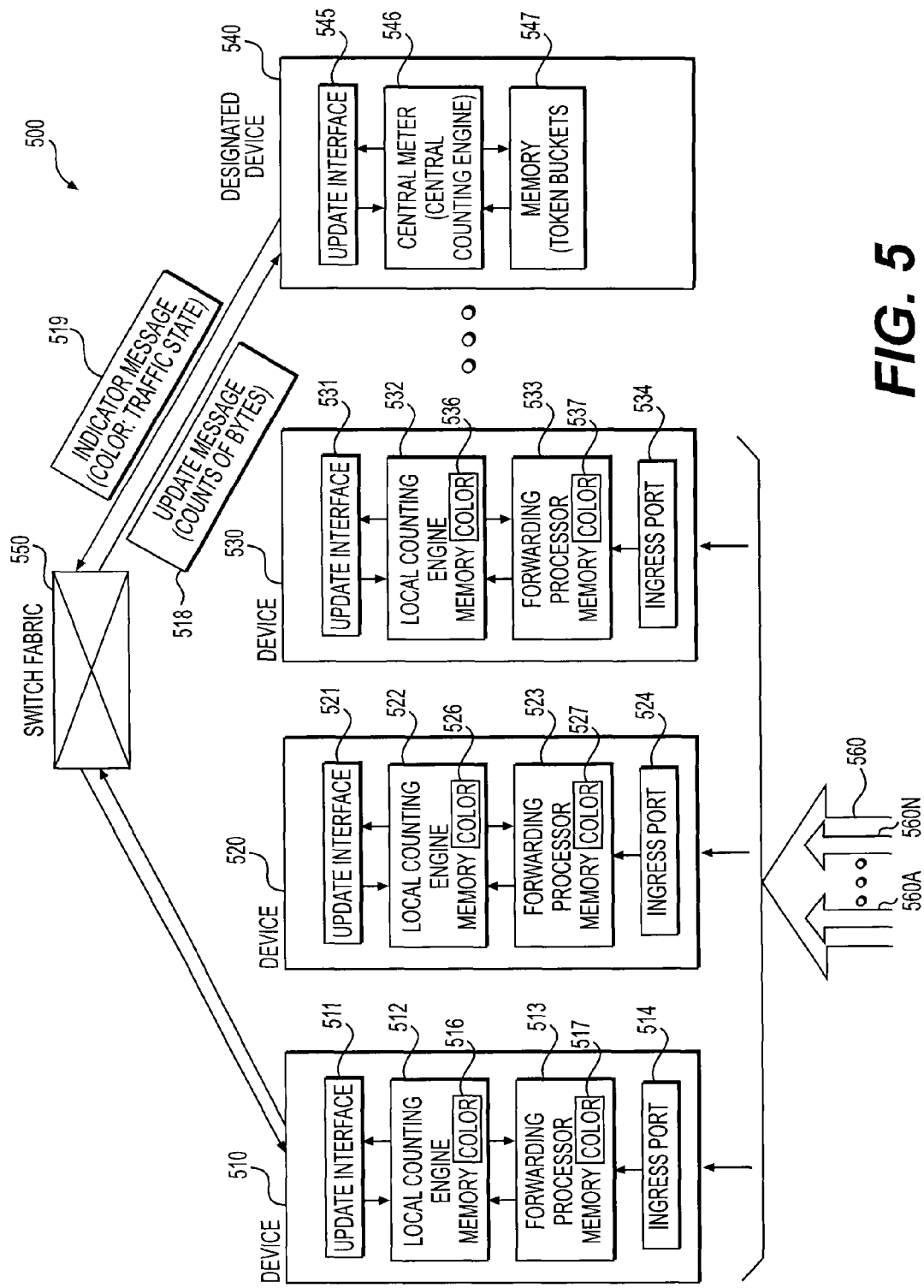
FIG. 5 shows a chassis switch 500 having a distributed meter according to an embodiment of the disclosure.

FIG. 5 shows a chassis switch 500 having a distributed meter according to an embodiment of the disclosure. The chassis switch 500 includes a plurality of distributed devices 510-540 interconnected through a switch fabric 550. Each of the devices 510-530 as clients transmit update messages to the device 540, and the device 540 has a database storing meter values for each packet flows. Meter values refer to numbers of tokens of buckets that are used in meter algorithms. Each of the devices 510-530 includes an update interface 511-531, an local counting engine 512-532, a forwarding processor 523-533, and an ingress port 514-534, respectively. The device 540 is designated to perform a function of a central meter to measure traffics of different packet flows. The designated device 540 includes an update interface 545, a central meter 546, and a memory 547. The local counting engine 512-532, the update interface 511-531, the update interface 545, the central meter 546, and the memory 547 form the distributed counter.

In an embodiment, the chassis switch 500 performs rate limiting on packet flows 560A-560N in a packet stream 560 entering the chassis switch 500. Rate limiting is a process of processing packets of a specific packet flow based on data rate at which the packets of the packet flow are transmitted. For example, a packet flow 560A comes from a customer and enters the chassis switch 500 that belongs to a service provider. When, at a specific time, a data rate, expressed in bit per second (bps), for example, of the packet flow 560A exceeds a peak rate defined by a service level agreement (SLA) between the customer and the service provider, the chassis switch 500 can temporarily drop all or a portion of packets belonging to the packet flow 560A. In other cases, when the date rate of the packet flow 560A exceeds a committed rate (smaller than the peak rate) but is below the peak rate, the chassis switch 500 can attach a label to the packets being processed at the moment, and later, the packets with the label can be treated differently from other packets belonging to the packet flow 560A, but without a such label. For example, the packets with the label can be dropped preferentially when congestion arises in the network in a later time.

In an embodiment, the chassis switch 500 uses the distributed meter to measure traffics of packet flows against certain predefined data rates to carry out a rate limiting process. In the embodiment, the central meter 546 supports R/W messages instead of RMW messages to perform database record updating, thus the time division access scheme is used by the devices 510-512 to transmit update messages. Specifically, using the packet flow 560A as an example, the rate limiting process can include three phases. During the first phase, the devices 510-530 respectively receive packets belonging to the packet flow 560A, count the packets using the statistical approach, and transmit packet counting information to the device 540. During the second phase, the designated device 540 measures traffic of the packet flow 560A using the central meter 546. The designated device 540 receives packet counting information from multiple devices 510-530, and measures traffic of the packet flow 560A based on the packet counting information against a set of predefined data rates. As a result of the measurement, indicators of traffic states are generated, and the designated device transmits indicators of traffic states to a device among the devices 510-530 in response to receiving the packet counting information from the device. During the last phase, each of the devices 510-530 receives the indicator respectively and stores it locally. Then, the indicator is used to process the packets of the packet flow 560A until a next indicator is received.

Taking the device 510 as an example, the process of the first phase is similar to that the device 210 carries out in the FIG. 2 example. During the first phase, the ingress port 514 receives a packet of the packet flow 560A and passes the packet to the forwarding processor 513. The forwarding processor 513 identifies the packet and sends a counting request to the local counting engine 512. The local counting engine 512 statistically determines whether to update the designated device 540 or not; when the determination is positive, the local counting engine 512 calculates an estimation of bytes and transmits the estimation to the update interface 511 where an update message 518 including the estimation is added to a queue waiting to be transmitted. When access to the designated device 540 is granted by a time wheel, packet counting information (the estimation of bytes) is transmitted with the update message 518 to the designated device 540. The same process takes place in the device 520 or 530.

During the second phase, at the designated device 540, the update interface 545 receives the update messages 518 carrying the packet counting information from multiple devices 510-530. Under control of the time wheel, during each time slot, only messages from one of the device 510-530 are received and processed. In current example, the device 510 is the device that is assigned a time slot by the time wheel. Next, the update interface 545 passes the packet counting information to the central meter 546.

The central meter 546 measures the traffic of the packet flow 560A against a set of predefined data rate using a meter algorithm. As a result, the measurement generates an indicator of a traffic state. The indicator of a traffic state indicates data rate of the traffic being measured in terms of comparison with the predefined data rate. For example, if the data rate of the packet flow 560A exceeds the peak rate in the SLA mentioned earlier, the central meter 546 can generate a red color; if the date rate exceeds the committed rate but is below the peak rate, the central meter 546 can generate a yellow color; if the date rate is below the committed rate, a green color can be generated. In these examples, colors are used as indicators of a traffic state. It is noted that the indicator of a traffic state indicates the current data rate of the packet flow 560A as a whole, not the date rate of the packets received only at one of the devices 510-530.

After an indicator is generated, it is passed to the update interface 545. The update interface 545 then transmits an indicator message 519 includes the indicator to the device 510 that is currently assigned the time slot by the time wheel.

During the third phase, the device 510 receives the indicator of a traffic state and processes packets of the packet flow 560A based on the indicator. Specifically, the update interface 511 receives the indicator message 519 and passes the indictor to the local counting engine 516. The local counting engine 512 includes a memory 516 where a previously received indicator is stored, and the memory 516 is updated with the indicator newly received.

As described above, when a packet is received and identified as belonging to the packet flow 560A, the forwarding processor 513 sends a counting request to the local counting engine 512. In response to receiving the counting request, the local counting engine 512 can return the indicator stored in the memory 516 to the forwarding processor 513. Specifically, in one embodiment, the local counting engine 512 first checks whether colors of indicators have changed since the last time returning an indicator to the forwarding processor 512. If the colors have changed, the operation of returning the indicator will be performed. Otherwise, the operation will not take place.

Thereafter, at the forwarding processor 513, a memory 517 where a previously received indicator is stored is updated with the newly received indicator.

Finally, the forwarding processor 513 processes packets belonging to the packet flow 560A based on the newly stored indicator, until another new indicator is received. For example, as described earlier, if the indicator is a red color, the packets identified as belonging to the packet flow 560A can be dropped; or, if the indicator is a yellow color, the packets identified can be attached with a label indicating the yellow color, etc.

It is noted that, in an embodiment, the update of indicators stored in the memory 516 only happens after an update message 518 is transmitted and an indicator message 519 is received. Because the local counting engine 512 uses the statistical approach, if, for example, for each 10 packets received, only the arrival of a single packet triggers the transmission of the update message, then, for each 10 such packets, there is only one chance for the memory 516 to be updated. While an indicator stored in the memory 516 is not updated, the indicator stored in the memory 517 cannot be updated, either. Accordingly, the forwarding processor processes the packets of the packet flow 560A based on an indicator that is received previously and stored in the memory 517.

It is noted that, in another embodiment, the designated device 540 transmits an indicator of traffic states to a device among the devices 510-530 without receiving packet counting information from the device. For example, the designated device 540 can periodically transmit an indicator of traffic states generated by the central meter 546 to a device among the devices 510-530 which does not transmit update messages to the designated device 540 for a period of time.

In an embodiment, the memories 516 and 517 are implemented as caches that support fast data request.

Figure 6:
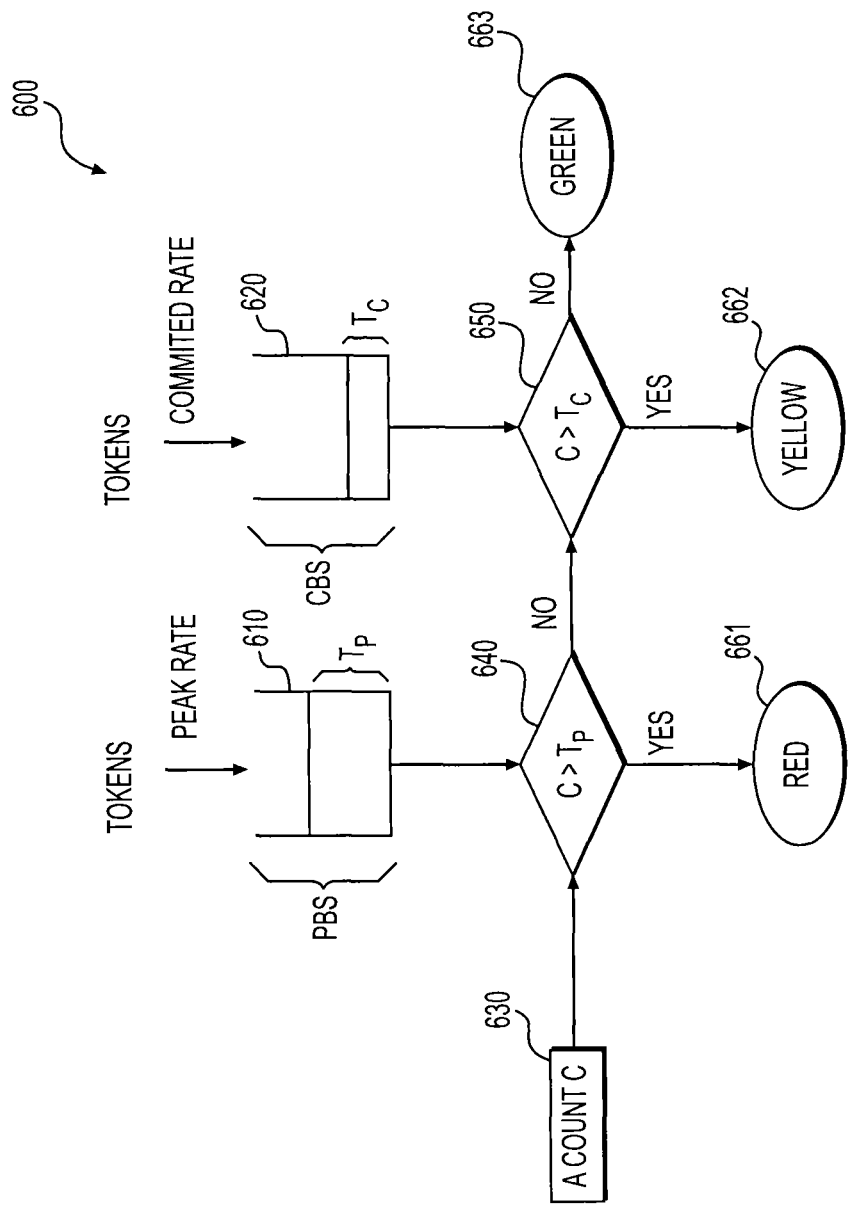
FIG. 6 shows a diagram illustrating a meter algorithm 600 according to an embodiment of the disclosure.

FIG. 6 shows a diagram illustrating a meter algorithm 600 according to an embodiment of the disclosure. The algorithm 600 is used in the FIG. 5 example. The algorithm 600 includes two token buckets 610 and 620. The first token bucket 610 has a peak burst size (PBS) equal to a maximum capacity of the first token bucket 610 and a current size (Tp) equal to a number of tokens holding in the first token bucket 610. The first token bucket receives tokens at a peak rate, such as the peak rate in the SLA mentioned earlier. Similarly, the second token bucket 620 has a committed burst size (CBS) equal to a maximum capacity of the second token bucket 620 and a current size (Tc) equal to a number of tokens holding in the second token bucket 620, and receives tokens at a committed rate, such as the committed rate in the SLA mentioned earlier. The peak rate and the committed rate used in the algorithm 600 are referred to as predefined rates.

As shown, when an estimation of bytes, depicted as C, is received at 630, the estimation of bytes C is compared with the current size Tp of the token bucket 610 at 640. If C>Tp, a red color indicator 661 is generated; otherwise, a number of tokens equal to C is removed from the first token bucket 610, and the estimation of bytes C is compared with the current size Tc of the token bucket 620 at 650. If C>Tc, a yellow color indicator 662 is generated; otherwise, a number of tokens equal to C is removed from the second token bucket 620, and a green color indicator is generated.

In an embodiment, the central meter 546 in FIG. 5 uses the algorithm 600 to process the received packet counting information to measure the traffic of the packet flow 560A against a set of predefined data rate, such as the peak rate and the committed rate mentioned earlier. The token buckets 610 and 620 are implemented using counters stored in the memory 547, and the numbers of tokens, referred to as meter values, are updated when tokens are removed from the token buckets 610 and 620 while the central meter 546 runs the algorithm 600.

It is noted that various algorithms can be used at the central meter 546, such as token bucket algorithms with various number of token buckets and colors, leaky bucket algorithms, and the like.

Figure 7:
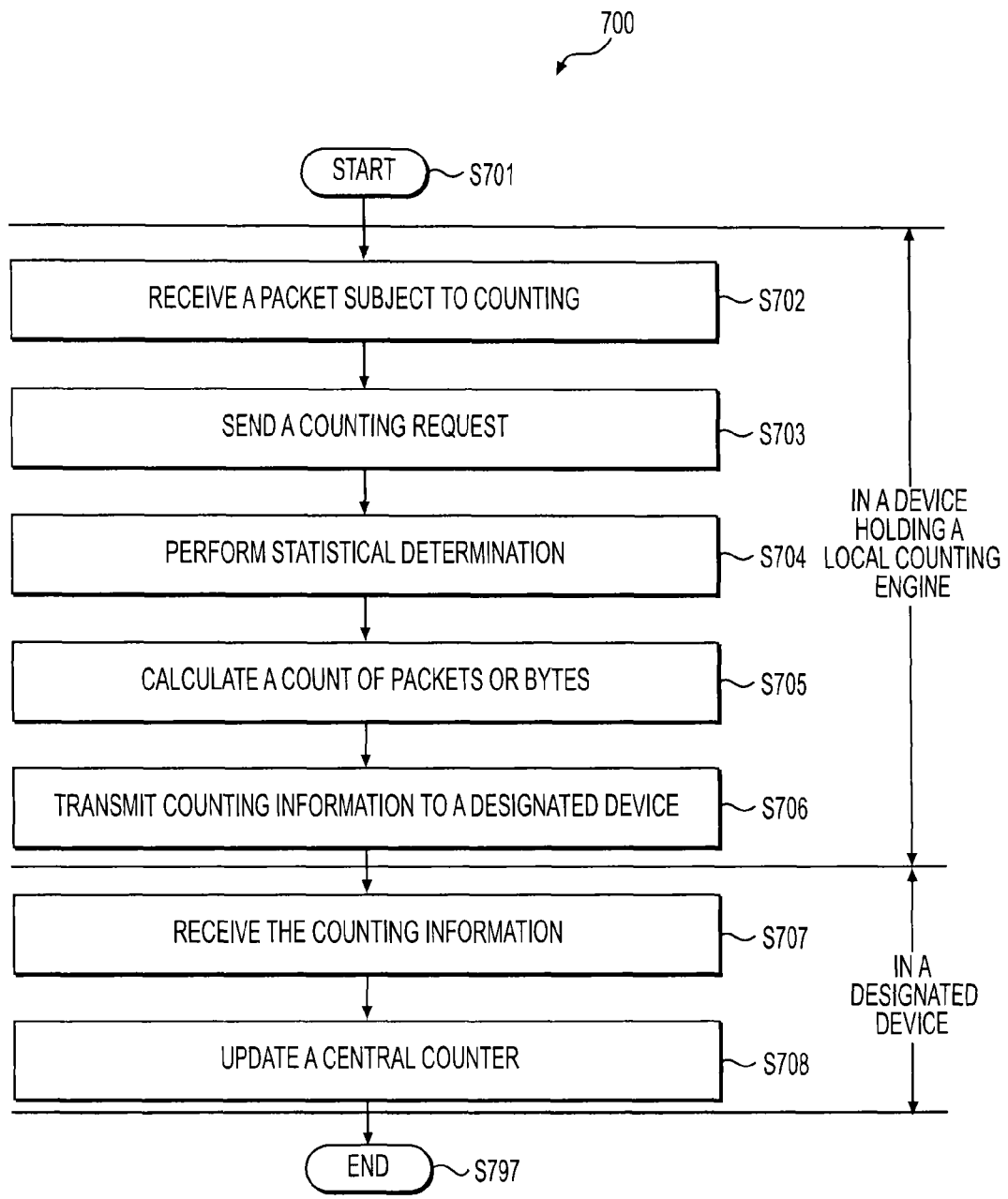
FIG. 7 shows a flow chart of a counting process 700 according to an embodiment of the disclosure.

FIG. 7 shows a flow chart of a counting process 700 using the distributed counter described in FIG. 2 according to an embodiment of the disclosure. The process 700 can be divided into two phases: the first phase includes steps S702-S706 and takes place in a device holding a local counting engine, such as the devices 210-230 in FIG. 2; the second phase includes steps S707 and S708 and takes place in a designated device holding a central counter, such as the designated device 240 in FIG. 2. With reference to FIG. 2, the process 700 is described as follows.

The process 700 starts at S701 and proceeds to S702.

At S702, a packet belonging to a packet stream is received at an ingress port and is passed to a forwarding processor.

At S703, the forwarding processor identifies the packet as a packet belonging to a packet flow subject to counting and sends a counting request to a local counting engine.

At S704, the local counting engine statistically determines whether to transmit packet counting information to a designated device. If a negative result is reached, the local counting engine does not transmit; if a positive result is reached, the process proceeds to S705.

At S705, the local counting engine calculates a count of packets or bytes as an estimation of the packets or bytes based on the statistical approach described earlier and sends the estimation to an update interface.

At S706, at the update interface, an update message including the estimation is added to a message queue. When a time wheel grants a time slot to the update interface, the update interface transmits the packet counting information to a designated device.

At S707, at the designated device, an update interface receives the update message including the packet counting information and passes the packet counting information to a central counter.

At S708, the central counter updates a counter value stored in a memory. The process then proceeds to S799 and terminates.

Figure 8:
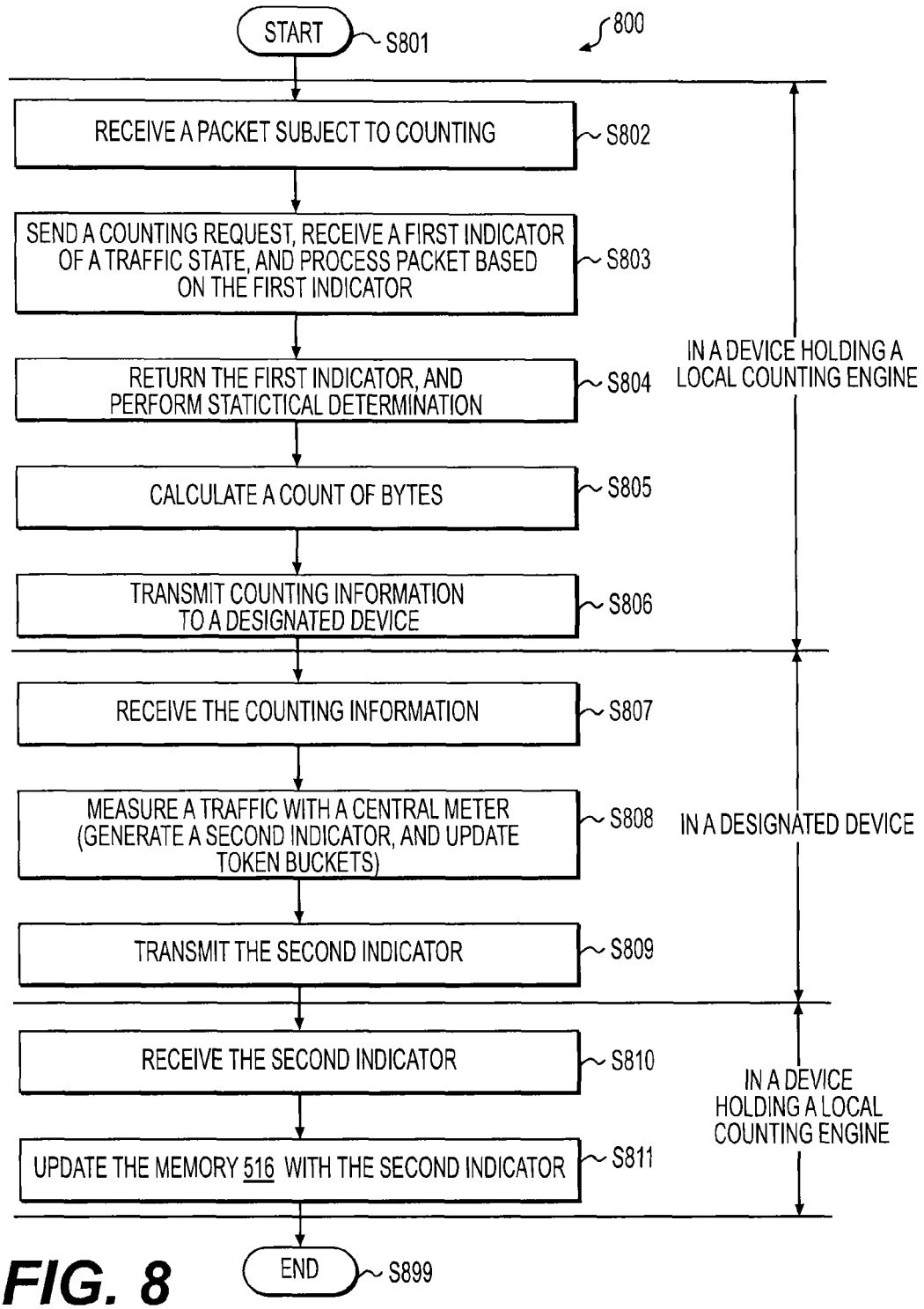
FIG. 8 shows a flow chart of a metering process 800 according to an embodiment of the disclosure.

FIG. 8 shows a flow chart of a metering process 800 according to an embodiment of the disclosure. The metering process 800 takes place in a rate limiting operation using the distributed meter described in FIG. 5. The process 800 can be divided into three phases: the first phase includes steps S802-S806 and takes place in a device holding a local counting engine, such as devices 510-530 in FIG. 5; the second phase includes steps S807-S809 and takes place in a designated device holding a central meter, such as the designated device 540 in FIG. 5; the third phase includes steps S810 and S811 and takes place in the device where the first phase of the process takes place. With reference to FIG. 5, the process 800 is described as follows.

The process 800 starts at S801 and proceeds to S802.

At S802, at a device holding a local counting engine, a packet belonging to a packet stream is received at an ingress port and is passed to a forwarding processor.

At S803, the forwarding processor identifies the packet as a packet belonging to a packet flow subject to counting and sends a counting request to the local counting engine. In addition, the forwarding processor can receive a first indicator of a traffic state from the local counting engine, and updates a memory in the forwarding processor, where a previous indicator is stored, with the first indicator. Thereafter, the forwarding processor processes packets belonging to the packet flow based on the first indicator until a new indicator is received.

At S804, in response to receiving the counting request from the forwarding processor, the local counting engine can transmit the first indicator to the forwarding processor. Specifically, the local counting engine checks whether an indicator with a different color has been received and stored in a memory in the local counting engine since last transmission of an indicator to the forwarding process. If so, the indicator stored in the memory in the local counting engine will be transmitted to the forwarding processor.

In addition, the local counting engine statistically determines whether to transmit packet counting information to a designated device. If a negative result is reached, the local counting engine does not transmit; if a positive result is reached, the process proceeds to S805.

At S805, the local counting engine calculates a count of bytes as an estimation of the bytes based on the statistical approach described earlier and sends the estimation to an update interface.

At S806, similar to the step S706 in FIG. 7, an update message including the estimation of bytes is added to a message queue. When a time wheel grants a time slot to the update interface, the update interface transmits the packet counting information to the designated device.

At S807, similar to the step S707 in FIG. 7, at the designated device, an update interface receives the update message including the packet counting information and passes the packet counting information to a central meter.

At S808, traffic measurement with the central meter takes place. Specifically, a second indicator having a color indicating a traffic state of the packet flow subject to counting is generated, and token buckets are updated.

At S809, the second indicator is transmitted at the update interface of the designated device to the device holding the local counting engine.

At S810, at the device holding the local counting engine, the second indicator is received at the update interface and passed to the local counting engine.

At S811, finally, the local counting engine updates the memory in the local counting engine with the second indicator. Then, the process proceeds to S899 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving, at a first device of a packet processing system having a plurality of distributed packet processing devices, packets in a packet flow;
   determining, based on a probability, whether to update a central counting engine disposed at a designated device among the plurality of distributed packet processing devices with estimated packet counting information generated from less than all of the packets in the packet flow; and
   periodically transmitting estimated packet counting information to the designated device for counting packets of the packet flow.

2. The method of claim 1, wherein the central counting engine disposed at the designated device receives a plurality of estimated packet counting information corresponding to the packet flow from the plurality of distributed packet processing devices, and counts packets of the packet flow based on the plurality of estimated packet counting information.

3. The method of claim 1, wherein transmitting estimated packet counting information comprises:
   assigning a time slot based on a time wheel at the first device; and
   transmitting estimated packet counting information to the designated device in the time slot assigned by the time wheel.

4. The method of claim 1, wherein determining, based on the probability, whether to update the central counting engine comprises:
   determining whether a random number is within a range corresponding to the probability; and
   when the random number is within the range corresponding to the probability, determining to update the central counting engine with estimated packet counting information including the reciprocal of the probability as a count of packets.

5. The method of claim 1, wherein determining, based on a probability, whether to update the central counting engine comprises:
   calculating a ratio of a packet size of the packet to a predefined threshold;
   when the ratio is larger than 1, determining to update the central counting engine with estimated packet counting information including the packet size as a count of bytes; and
   when the ratio is smaller than 1, determining whether to update the central counting engine with estimated packet counting information based on a probability equal to the ratio.

6. The method of claim 5, wherein determining, based on the probability equal to the ratio, whether to update the central counting engine with estimated packet counting information comprises:
   determining whether a random number is within a range corresponding to the probability equal to the ratio; and
   when the random number is within the range corresponding to the probability equal to the ratio, determining to update the central counting engine with packet counting information including the predefined threshold as a count of bytes.

7. The method of claim 1, wherein the packet flow is defined at least by packets originating from a same source and addressed to a same destination.

8. A device in a packet processing system having a plurality of distributed packet processing devices, comprising:
   an ingress port configured to receive packets in a packet flow;
   a local counting engine that is configured to determine, based on a probability, whether to update a central counting engine disposed at a designated device among the plurality of distributed packet processing devices with estimated packet counting information generated from less than all of the packets in the packet flow; and
   an update interface configured to periodically transmit estimated packet counting information to the designated device for counting packets of the packet flow.

9. The device of claim 8, wherein the update interface comprises a time wheel that is configured to assign a time slot for transmitting estimated packet counting information.

10. The device of claim 8, wherein the local counting engine is further configured to:
    determine whether a random number is within a range corresponding to the probability; and
    when the random number is within the range corresponding to the probability, determine to update the central counting engine with estimated packet counting information including the reciprocal of the probability as a count of packets.

11. The device of claim 8, wherein the local counting engine is further configured to:
calculate a ratio of a packet size of the packet to a predefined threshold;
when the ratio is larger than 1, determine to update the central counting engine with estimated packet counting information including the packet size as a count of bytes; and
when the ratio is smaller than 1, determine, based on a probability equal to the ratio, whether to update the central counting engine with estimated packet counting information.

12. The device of claim 11, wherein the local counting engine is further configured to:
determine whether a random number is within a range corresponding to the probability equal to the ratio; and
when the random number is within the range corresponding to the probability equal to the ratio, determine to update the central counting engine with packet counting information including the predefined threshold as a count of bytes.

13. A designated device in a packet processing system having a plurality of distributed packet processing devices, comprising:
an update interface that is configured to receive a plurality of estimated packet counting information from the plurality of distributed packet processing devices that receive packets in a packet flow and determines, based on a probability, whether to update the designated device with estimated packet counting information; and
a central counting engine that is configured to count packets of the packet flow based on the plurality of estimated packet counting information.

14. The designated device of claim 13, wherein the central counting engine is configured to update a counter based on the plurality of estimated packet counting information to count packets of the packet flow.

15. The designated device of claim 13, wherein the central counting engine is further configured to count a number of packets to count packets of the packet flow.

16. The designated device of claim 13, wherein the central counting engine is further configured to count a number of bytes to count packets of the packet flow.

17. A method, comprising:
receiving, at a first device of a packet processing system having a plurality of distributed packet processing devices, packets in a packet flow;
determining, based on a probability, whether to update a central counting engine disposed at a designated device among the plurality of distributed packet processing devices with estimated packet counting information generated from less than all of the packets in the packet flow; and
periodically, transmitting packet counting information to the designated device for measuring data rate of the packet flow.

18. The method of claim 17, further comprising:
receiving, from the designated device, an indicator of a data rate of the packet flow determined based on the estimated packet counting information; and
storing the indicator of the data rate in the first device.

19. The method of claim 18, further comprising:
processing packets belonging to the packet flow based on the indicator of the data rate stored in the first device.

20. The method of claim 17, wherein the central counting engine at the designated device receives a plurality of estimated packet counting information corresponding to the packet flow from the plurality of packet processing devices in the packet processing system, and the designated device measures data rate of the packet flow based on the plurality of packet counting information.

21. The method of claim 20, further comprising:
storing an indicator of a data rate of the packet flow determined based on the plurality of estimated packet counting information received by the central counting engine at the designated device; and
processing packets belonging to the packet flow in ones of the plurality of packet processing devices based on the stored indicator of the data rate.

22. The method of claim 17, wherein transmitting estimated packet counting information comprises:
assigning a time slot based on a time wheel at the first device; and
transmitting estimated packet counting information to the designated device in the time slot assigned by the time wheel.

23. The method of claim 17, wherein determining, based on the probability, whether to update the central counting engine comprises:
determining whether a random number is within a range corresponding to the probability; and
when the random number is within the range corresponding to the probability, determining to update the central counting engine with packet counting information including the reciprocal of the probability as a count of packets.

24. The method of claim 17, wherein determining, based on a probability, whether to update the central counting engine comprises:
calculating a ratio of a packet size of the packet to a predefined threshold;
when the ratio is larger than 1, determining to update the central counting engine with estimated packet counting information including the packet size as a count of bytes; and
when the ratio is smaller than 1, determining, based on a probability equal to the ratio, whether to update the central counting engine with estimated packet counting information.

* * * * *